US011126873B2

(12) United States Patent
Lee et al.

(10) Patent No.: US 11,126,873 B2
(45) Date of Patent: Sep. 21, 2021

(54) VEHICLE LIGHTING STATE DETERMINATION

(71) Applicant: Zoox, Inc., Foster City, CA (US)

(72) Inventors: Tencia Lee, San Francisco, CA (US); Kai Zhenyu Wang, Foster City, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 15/982,658

(22) Filed: May 17, 2018

(65) Prior Publication Data
US 2019/0354786 A1    Nov. 21, 2019

(51) Int. Cl.
*G06K 9/00*     (2006.01)
*G06K 9/66*     (2006.01)
(Continued)

(52) U.S. Cl.
CPC ....... *G06K 9/00825* (2013.01); *G05D 1/0088* (2013.01); *G05D 1/0221* (2013.01);
(Continued)

(58) Field of Classification Search
CPC .... G06K 9/00825; G06K 9/66; G05D 1/0246; G05D 1/0088; G05D 1/0221; G06N 7/005; G06N 3/08
See application file for complete search history.

(56) References Cited

U.S. PATENT DOCUMENTS 5,177,685 A    1/1993  Davis et al.
6,707,421 B1   3/2004  Drury et al.
(Continued)

FOREIGN PATENT DOCUMENTS

EP    3217332    9/2017
GB    2547082    8/2017
(Continued)

OTHER PUBLICATIONS

Anonymous "Outline of machine learning—Wikipedia", Mar. 27, 2018, Retrieved from the Internet: URL:https://en.wikipedia.org/w/index.php?title=Outline_of_machine_learning&oldid=832722436, retrieved on Jul. 9, 2019, section entitled "Machine learning methods", 28 pages.

(Continued)

*Primary Examiner* — Jelani A Smith
*Assistant Examiner* — Alexander C. Bost
(74) *Attorney, Agent, or Firm* — Lee & Hayes, P.C.

(57) ABSTRACT

Techniques for determining lighting states of a tracked object, such as a vehicle, are discussed herein. An autonomous vehicle can include an image sensor to capture image data of an environment. Objects such can be identified in the image data as objects to be tracked. Frames of the image data representing the tracked object can be selected and input to a machine learning algorithm (e.g., a convolutional neural network, a recurrent neural network, etc.) that is trained to determine probabilities associated with one or more lighting states of the tracked object. Such lighting states include, but are not limited to, a blinker state(s), a brake state, a hazard state, etc. Based at least in part on the one or more probabilities associated with the one or more lighting states, the autonomous vehicle can determine a trajectory for the autonomous vehicle and/or can determine a predicted trajectory for the tracked object.

20 Claims, 8 Drawing Sheets

(51) Int. Cl.
  *G05D 1/02* (2020.01)
  *G06N 7/00* (2006.01)
  *G06N 3/08* (2006.01)
  *G05D 1/00* (2006.01)

(52) U.S. Cl.
  CPC ............. *G05D 1/0246* (2013.01); *G06K 9/66* (2013.01); *G06N 3/08* (2013.01); *G06N 7/005* (2013.01); *G06K 9/00791* (2013.01)

(56) References Cited

U.S. PATENT DOCUMENTS

| | | | |
|---|---|---|---|
| 8,112,225 | B2 | 2/2012 | Eidehall et al. |
| 8,121,749 | B1 | 2/2012 | Agrawal et al. |
| 8,473,447 | B2 | 6/2013 | Yoon et al. |
| 8,645,310 | B2 | 2/2014 | Jiang et al. |
| 8,880,272 | B1 | 11/2014 | Ferguson et al. |
| 9,381,916 | B1 | 7/2016 | Zhu et al. |
| 9,495,874 | B1 | 11/2016 | Zhu et al. |
| 9,507,347 | B1* | 11/2016 | Ogale ................ G06K 9/00825 |
| 9,558,659 | B1 | 1/2017 | Silver et al. |
| 9,568,915 | B1 | 2/2017 | Berntorp et al. |
| 9,612,123 | B1 | 4/2017 | Levinson et al. |
| 10,059,334 | B1 | 8/2018 | Zhu et al. |
| 10,061,322 | B1* | 8/2018 | Palefsky-Smith ... G06K 9/6273 |
| 10,387,736 | B2* | 8/2019 | Wang ................ G06K 9/00718 |
| 2003/0187578 | A1 | 10/2003 | Nishira et al. |
| 2005/0049785 | A1 | 3/2005 | Vergin |
| 2011/0125344 | A1 | 5/2011 | An et al. |
| 2011/0205042 | A1 | 8/2011 | Takemura et al. |
| 2014/0324268 | A1 | 10/2014 | Montemerlo et al. |
| 2017/0031361 | A1 | 2/2017 | Olson et al. |
| 2017/0131719 | A1* | 5/2017 | Micks .................. G06K 9/3233 |
| 2017/0192426 | A1 | 7/2017 | Rust |
| 2017/0192437 | A1 | 7/2017 | Bier et al. |
| 2017/0193338 | A1 | 7/2017 | Huberman et al. |
| 2017/0277195 | A1 | 9/2017 | Frazzoli et al. |
| 2017/0364758 | A1* | 12/2017 | Minster .............. G06K 9/00825 |
| 2018/0068191 | A1* | 3/2018 | Biemer .............. G06K 9/00825 |
| 2018/0095465 | A1 | 4/2018 | Gao et al. |
| 2018/0137380 | A1* | 5/2018 | Alrefai ............... G06K 9/00825 |
| 2018/0144202 | A1* | 5/2018 | Moosaei ............. G06K 9/6274 |
| 2018/0148051 | A1 | 5/2018 | Lujan et al. |
| 2018/0164816 | A1* | 6/2018 | Hashimoto ............ G08G 1/162 |
| 2018/0224860 | A1 | 8/2018 | Warshauer-Baker et al. |
| 2018/0251126 | A1 | 9/2018 | Linscott et al. |
| 2019/0025841 | A1* | 1/2019 | Haynes .............. G01C 21/3492 |
| 2019/0051069 | A1* | 2/2019 | Cooley .............. G06K 9/00288 |
| 2019/0061765 | A1 | 2/2019 | Marden et al. |
| 2019/0092318 | A1* | 3/2019 | Mei ...................... G06K 9/4628 |
| 2019/0101919 | A1 | 4/2019 | Kobilarov et al. |
| 2019/0122059 | A1* | 4/2019 | Zhou ........................ G06T 7/20 |
| 2019/0244058 | A1* | 8/2019 | Franca-Neto ........ G06N 3/0454 |
| 2019/0250626 | A1 | 8/2019 | Ghafarianzadeh et al. |
| 2019/0272750 | A1* | 9/2019 | Fukumoto ............ G08G 1/0965 |
| 2019/0308620 | A1 | 10/2019 | Sapp et al. |
| 2019/0329769 | A1* | 10/2019 | Shalev-Shwartz ........................ B60W 30/162 |
| 2019/0344804 | A1* | 11/2019 | Motomura ........... G05D 1/0088 |
| 2019/0359208 | A1 | 11/2019 | Sapp et al. |
| 2019/0361443 | A1 | 11/2019 | Linscott et al. |
| 2020/0086855 | A1 | 3/2020 | Packer et al. |
| 2020/0110416 | A1 | 4/2020 | Hong et al. |
| 2020/0160530 | A1* | 5/2020 | Mehnert ................ G06N 3/084 |

FOREIGN PATENT DOCUMENTS

| | | |
|---|---|---|
| WO | WO2016130719 | 8/2016 |
| WO | WO2017091690 | 6/2017 |

OTHER PUBLICATIONS

Heinemann, "Predicting Cut-Ins in Traffic Using a Neural Network", Master's thesis in Systems, Control and Mechatronics, Jan. 1, 2017, Retrieved from the Internet: URL:https://pdfs.semanticscholar.org/be17/0747667db2db224ccbe3f909ad99de14c78a.pdf [retrieved on Jul. 9, 2019], section 5.1 & 6, pp. 9-11.

The PCT Search Report and Written Opinion dated Jul. 17, 2019, for PCT Application No. PCT/US2019/025226, 13 pages.

The PCT Search Report and Written Opinion dated Aug. 22, 2019 for PCT Application No. PCT/US2019/031057, 8 pages.

The PCT Invitation to Pay Additional Fees dated Jun. 6, 2018 for PCT application No. PCT/US2018/019685, 12 pages.

The PCT Search Report and Written Opinion dated Jul. 30, 2018, for PCT Application No. PCT/US18/19685, 17 pages.

Office Action for U.S. Appl. No. 15/833,715, dated Oct. 2, 2019, Kobilarov et al., "Trajectory Prediction of Third-Party Objects Using Temporal Logic and Tree Search", 12 pages.

Office Action for U.S. Appl. No. 16/193,801, dated Oct. 24, 2019, Kobilarov, "Trajectory Generation Using Temporal Logic and Tree Search", 8 pages.

Office Action for U.S. Appl. No. 16/536,228, dated Sep. 26, 2019, Sapp et al., "Feature-Based Prediction", 6 pages.

U.S. Appl. No. 15/632,208, filed Jun. 23, 2017, Linscott, et al., "Trajectory Generation and Execution Architecture", 69 pages.

Broadhurst et al., "Monte Carlo Road Safety Reasoning", Proc IEEE Intelligent Vehicles Symposium, Jun. 2005, 6 pgs.

Gu et al, "On-Road Motion Planning for Autonomous Vehicles", Proc 5th Intl Conf on Intelligent Robotics and Applications, vol. Part III, ICIRA Oct. 2012, pp. 588-597.

McMahon et al., "Sampling-Based Tree Search with Discrete Abstractions for Motion Planning with Dynamics and Temporal Logic", IEEE/RSJ Intl Conf on Intelligent Robots and Systems, Sep. 2014, 9 pgs.

Office Action for U.S. Appl. No. 15/632,147, dated Apr. 30, 2018, Kobilarov et al., "Trajectory Generation Using Temporal Logic and Tree Search", 6 pages.

Wongpiromsam et al., "Receding Horizon Temporal Logic Planning", IEEE Transactions on Automatic Control, vol. 57, Issue 11, Nov. 2012, 14 pgs.

The PCT Search Report and Written Opinion dated Apr. 15, 2019, for PCT Application No. PCT/US2019/016407, 11 pages.

Final Office Action dated Mar. 2, 2020 for U.S. Appl. No. 16/536,228 "Feature-Based Prediction", Sapp, 6 pages.

Non Final Office Action dated May 18, 2020 for U.S. Appl. No. 15/897,028 "Detecting Blocking Objects" Ghafarianzadeh, 21 pages.

Non Final Office Action dated Sep. 9, 2020 for U.S. Appl. No. 16/536,228, "Feature-Based Prediction", Sapp, 7 pages.

* cited by examiner

VEHICLE LIGHTING STATE DETERMINATION

BACKGROUND

Lights on a vehicle in an environment may provide clues regarding present or future behavior of that vehicle. For example, a driver of a vehicle may use a turn signal to indicate an intent to change lanes or turn. A vehicle with active brake lights may indicate that the vehicle may slow down. However, inaccurately determining lighting of a vehicle, or the inability to classify a lighting state of the vehicle (e.g., due to ambiguity and/or insufficient data), can result in collisions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
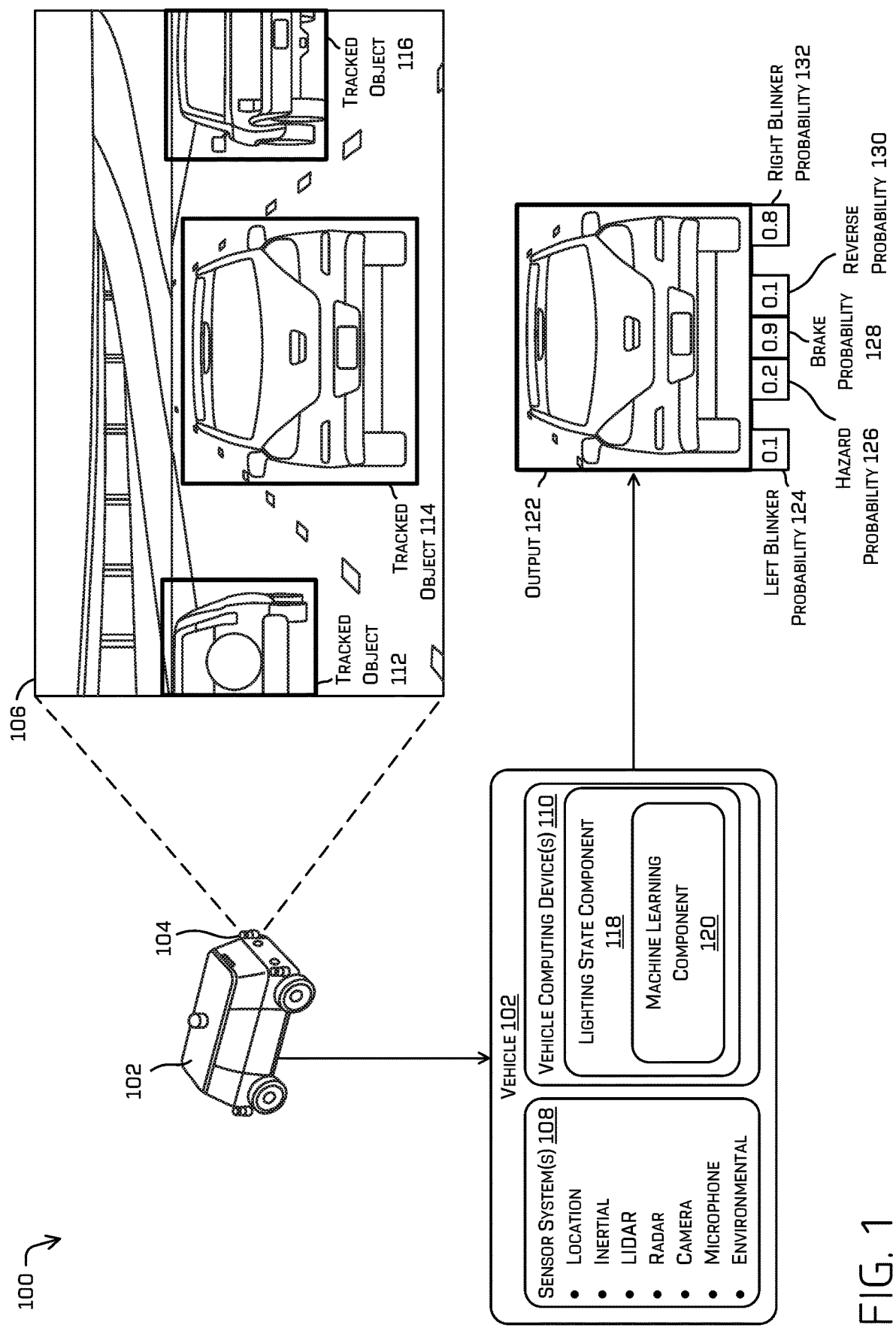
FIG. 1 is a schematic diagram illustrating an example implementation to determine lighting states of tracked objects, such as one or more vehicles, in accordance with embodiments of the disclosure.

This disclosure is directed to techniques for determining lighting states of a tracked object, such as a vehicle. For example, an autonomous vehicle can include an image sensor to capture image data of an environment. Objects such as vehicles proximate to the autonomous vehicle can be identified (e.g., using a detector and/or classifier) in the image data as objects to be tracked. Based at least in part on a sampling frequency, frames of the image data representing the tracked object can be selected and input to a machine learning algorithm that is trained to determine probabilities associated with one or more lighting states of the tracked object. For example, the machine learning algorithm can receive cropped image data from any number of frames (e.g., five frames) spanning any period of time (e.g., 0.5 seconds). In some instances, the machine learning algorithm can output independent probabilities associated with each lighting state. That is, the machine learning algorithm (e.g., a convolutional neural network, a recurrent neural network, and the like) can output a probability that the frames represent a particular lighting state (or any combination of lighting states) of the tracked object. Examples of lighting states include, but are not limited to, a left blinker state, a right blinker state, a brake state, a hazard state, and the like. Based at least in part on the one or more probabilities associated with the one or more lighting states, the autonomous vehicle can determine a trajectory for the autonomous vehicle and/or can determine a predicted trajectory for the tracked object.

In some instances, the one or more probabilities that one or more lighting states are associated with a tracked object can be used to improve predictions associated with the tracked object and/or to generate trajectories associated with an autonomous vehicle. In one example, a machine learning algorithm can output a probability that a tracked object is associated with a braking state. In some examples, a vehicle computing device of an autonomous vehicle can use this information to more accurately predict a change of velocity associated with the tracked object. Further, such information can be used to generate a trajectory for an autonomous vehicle (e.g., to slow down in response to detecting brake lights in order to maintain a safe following distance between the autonomous vehicle and the tracked object).

In another example, if a vehicle is stopped in a lane and is determined to correspond to a hazard lighting state, a vehicle computing device (e.g., associated with the autonomous vehicle) can determine that the tracked object is a double-parked vehicle, and can generate a trajectory for an autonomous vehicle to drive around the tracked object rather than waiting for the object to move. In another example, a vehicle computing device can determine that a tracked object is executing a parallel parking maneuver (e.g., based on a braking state, a reverse state, a blinker state, and the like), and can generate a trajectory for the autonomous vehicle to drive around the tracked object leaving more room between the autonomous vehicle and the tracked object relative to the double-parked determination, as discussed above.

In another example where an autonomous vehicle is driving in a lane, a tracked object with an identified blinker state can indicate to the autonomous vehicle that the tracked object may enter a region associated with the autonomous vehicle (e.g., the road lane occupied by the autonomous vehicle, as referred to as a "cut-in event"). In another example, an autonomous vehicle can determine an emergency lighting state of a police vehicle, fire vehicle, ambulance, etc., and can generate a safe stop trajectory to slow down (or stop) and to pull over to a side of the road.

Accordingly, the vehicle computing device of the autonomous vehicle can generate a trajectory based on the lighting state of the tracked object.

Further, a prediction system of the autonomous vehicle can generate predicted trajectories of a tracked object. For example, when approaching an intersection or junction where vehicles can go straight, turn left, or turn right, an autonomous vehicle can determine probabilities associated with each predicted trajectory indicating a likelihood that the tracked object will follow each predicted trajectory. Upon determining a lighting state of the tracked object (e.g., detecting a blinker, brakes, and the like), the prediction system can update one or more probabilities associated with the predicted trajectories. Accordingly, the lighting state determination techniques can improve the accuracy of predictions associated with tracked objects and/or can improve an accuracy of trajectories of an autonomous vehicle.

The techniques discussed herein can improve a functioning of a computing device in a number of ways. For example, in the context of generating trajectories for an autonomous vehicle, determining a lighting state of one or more tracked objects can improve an accuracy and/or reduce a latency for generating a trajectory for an autonomous vehicle to follow. In the context of predicted trajectories for tracked objects, the techniques discussed herein can improve an accuracy of predictions. Improved trajectory generation and predicted trajectory generation can improve safety outcomes and can improve a rider experience (e.g., by anticipating actions in advance, thereby minimizing hard braking, swerving, or emergency braking scenarios). These and other improvements to the functioning of the computer and/or to the user experience are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems, and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two.

FIG. 1 is a schematic diagram illustrating an example implementation to determine lighting states of tracked objects, such as one or more vehicles, in accordance with embodiments of the disclosure.

As illustrated, an environment 100 can include a vehicle 102 that includes one or more image sensors 104 capturing image data 106 representing the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle can be associated with sensor system(s) 108 that can be disposed on the vehicle 102. The sensor system(s) 108 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor system(s) 108 can generate sensor data, which can be utilized by vehicle computing device(s) 110 associated with the vehicle 102.

In at least one example, the vehicle computing device(s) 110 can perform lighting state determinations based at least in part on sensor data received from the sensor system(s) 108 associated with the vehicle 102. As illustrated in the image data 106, the vehicle computing device(s) 110 identified tracked objects 112, 114, and 116, although any number of tracked objects can be determined. As illustrated, the tracked objects 112, 114, and 116 are associated with a bounding box that identifies each of the tracked objects. As discussed herein, the tracked objects 112, 114, and 116 can be identified by a classifier that is trained to identify objects (e.g., vehicles, bicycles, pedestrians, animals, buildings, etc.) in an environment. In at least one example, the vehicle computing device(s) 110 can include a lighting state component 118, which can be used to determine probabilities associated with one or more lighting states of the tracked objects 112, 114, and 116 in the environment 100.

In some examples, the lighting state component 118 can include a machine learning component 120. In some examples, the machine learning component 120 can include a convolutional neural network, a recurrent neural network, and the like, that has been trained to determine probabilities that image data represents one or lighting states associated with a tracked object. For example, training data for the machine learning component 120 can include image data of vehicles with ground truth annotations indicating whether a lighting state is represented in the image data. Examples of lighting states include, but are not limited to, one or more of a left blinker state (e.g., including front and rear left blinker states), a right blinker state (e.g., including front and rear right blinker states), a hazard state, a brake state, a reverse state an emergency state, and the like. Accordingly, upon receiving a number of frames of image data 106 captured by the image sensor 104 (or portions of image data 106 associated with vehicles detected in the image), for example, the machine learning component 120 can output one or more probabilities that one or more lighting states are represented in one or more frames of the input frames of image data and/or associated with one or more detected objects in the frames.

An example of an output 122 of the machine learning component 120 is illustrated in FIG. 1. For example, the output 122 represents the tracked object 114 associated with various probabilities that the tracked object 114 represents different lighting states. By way of example, the output 122 is illustrated as including a left blinker probability 124, a hazard probability 126, a brake probability 128, a reverse probability 130 (also referred to as a backup probability), and a right blinker probability 132. As can be understood, each of the probabilities 124, 126, 128, 130, and 132 can be independent of the other probabilities. That is, the probabilities 124, 126, 128, 130, and 132 can represent real-world driving conditions, such as when a vehicle is braking with a blinker. By way of example, and without limitation, FIG. 1 illustrates such an example condition where the left blinker probability 124 is 0.1; the hazard probability 126 is 0.2; the brake probability 128 is 0.9; the reverse probability 130 is 0.1; and the right blinker probability 132 is 0.8, indicating that the tracked object 114 braking is braking while turning right. As can be understood, the lighting state component 118 can determine lighting state probabilities for each of the tracked objects 112, 114, 116, and is not limited to providing a single output 122.

Figure 2:
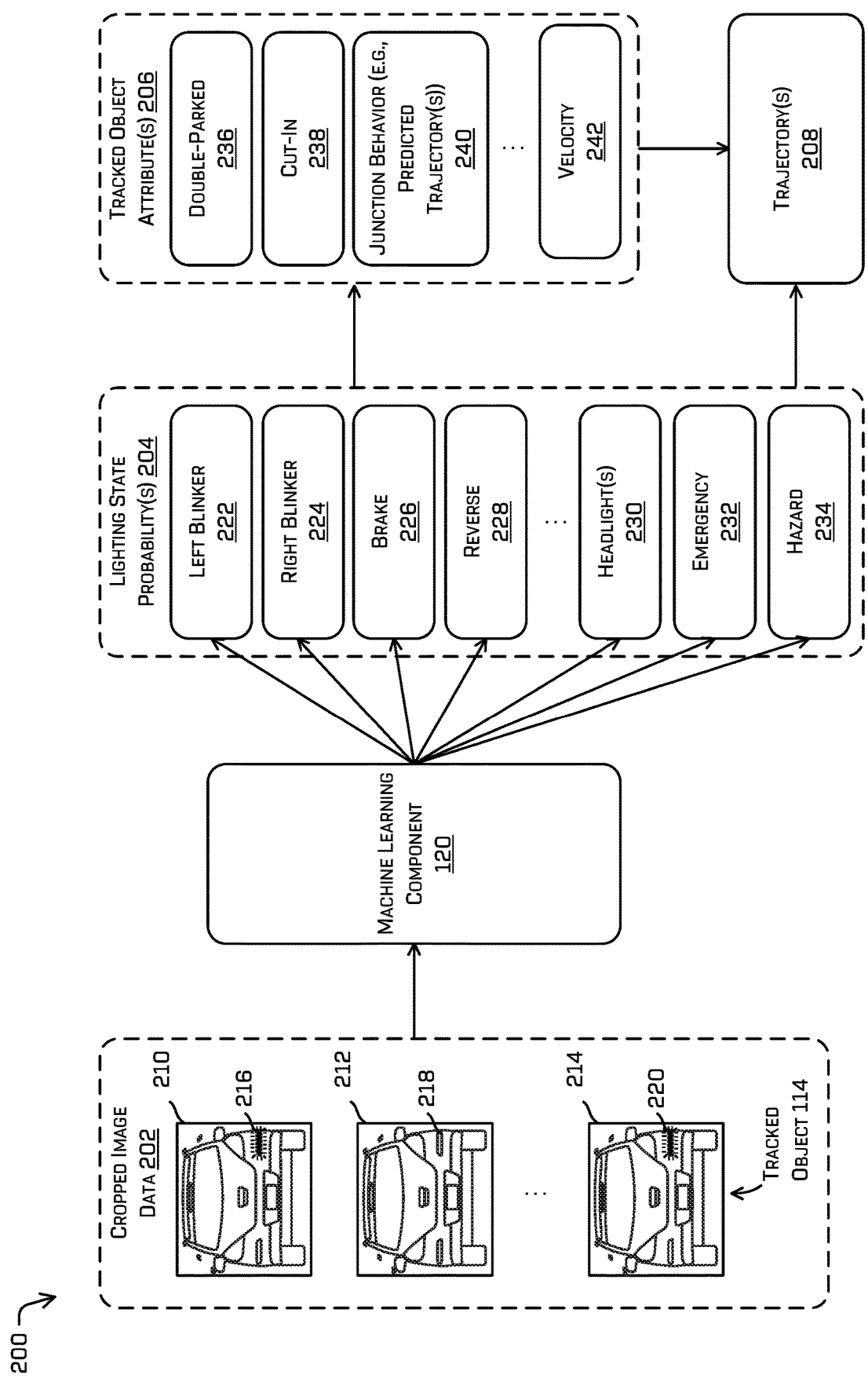
FIG. 2 is a block diagram illustrating an example process for using a machine learning component for determining lighting states in tracked objects, and for generating one or more trajectories based at least in part on the lighting states, in accordance with embodiments of the disclosure.

FIG. 2 is a block diagram 200 illustrating an example process for using a machine learning component for determining lighting states in tracked objects, and for generating one or more trajectories based at least in part on the lighting states, in accordance with embodiments of the disclosure.

In general, the block diagram 200 illustrates cropped image data 202 (e.g., representing the tracked object 114) input to the machine learning component 120, which can output lighting state probability(s) 204. In turn, the lighting state probability(s) 204 can be used to determine tracked object attribute(s) 206 and/or trajectory(s) 208, which can include trajectories and predicted trajectories. As discussed herein, a "trajectory" can refer to a trajectory of an autonomous vehicle (e.g., the vehicle 102), while a "predicted trajectory" can refer to a trajectory of a tracked object (e.g., the tracked object 114).

The cropped image data 202 can include one or more cropped instances of image data from various frames of image data captured by a vehicle (e.g., the vehicle 102). For example, the cropped image data 202 can include first cropped image data 210 representing the tracked object 114 at a first time, second cropped image data 212 representing the tracked object 114 at a second time, and third cropped image data 214 representing the tracked object 114 at a third time, and so on. In some instances, the cropped image data 202 can be based at least in part on a bounding box associated with the tracked object 114. In some instances, the bounding box can be generated by a classifier, a detector, or a segmenter, which can identify objects (such as vehicles) in image data. As illustrated, the cropped image data 202 represents a right turn signal alternating on and off, as illustrated by the lights 216 (e.g., in an "on" state), 218 (e.g., in an "off" state), and 220 (e.g., in an "on" state). Of course, any number and/or combination of lights may be associated with the tracked object 114.

In some instances, the cropped image data 202 can be based at least in part on a frame rate of an image sensor and/or a sampling frequency. For example, for an image sensor capturing thirty frames per second (e.g., 30 Hertz (Hz)), the cropped image data 202 may be generated by selecting a number of frames that corresponds to a time interval (e.g., 0.5 seconds). In at least some examples, the selected number of frames includes at least the most currently captured frame. Accordingly, in an example having a time period of 0.5 seconds and selecting from a total of 15 frames (e.g., 30 fps (frames per second) for 0.5 s), the sampling frequency can select five frames, with each frame separated by three unselected frames. Of course, any number of frames can be selected at any frequency and with any spacing, and is not limited to the specific examples discussed herein. As can be understood, a plurality of frames may be used, as a single frame may capture an instant when a turn signal is off (in a flashing sequence), which would provide an incorrect indication of the lighting state of the tracked object 114. As such, the time period and sampling frequency should be such that the time period is long enough to observe at least one duty cycle of an average change in lighting state of tracked objects and the sampling frequency differs from (or is phase shifted from) an average frequency of lighting state changes of tracked objects (e.g., an average blinker rate for vehicles). That is, the sampling frequency can be based at least in part on the signal to be captured by the data, which in this case, may correspond to lighting states of vehicles. Because the cropped image data 202 represents a number of sampled frames, the cropped image data 202 can be considered to be a subset of all captured image data.

As discussed above, the cropped image data 202 can be extracted from frames of image data to provide image data focused on the tracked object 114 to the machine learning component 120. In some instances, the cropped image data 202 can be scaled up or down based on an input size of data to the machine learning component. That is, a size of image data input to the machine learning component 120 can be normalized to a particular input data size associated with the machine learning component 120. As a non-limiting example, a crop having a size of 10×15 pixels may be scaled up to a size of 320×240 pixels. Similarly, a crop having a size of 514×407 pixels may be scaled down to a size of 320×240 pixels. Of course, the example sizes discussed herein are not intended to be limiting, and a variety of sizes are contemplated herein.

In any event, a plurality of frames of the cropped image data 202 can be simultaneously input to the machine learning component 120, which in turn can output the lighting state probability(s) 204. In some examples, the lighting state probability(s) can include, but is not limited to, probabilities of: a left blinker 222; a right blinker 224; a brake 226; a reverse 228; headlight(s) 230; an emergency 232; and a hazard 234. In some instances, probabilities associated with the left blinker 222 and the right blinker 224, respectively, can refer to a probability that the tracked object is associated with a left blinker (turn signal) lighting state or a right blinker lighting state. In some instances, the probability of the left blinker 222 can include a probability associated with a front left blinker and/or a rear left blinker. Similarly, the probability of the right blinker 224 can include a probability associated with the front right blinker and/or the rear right blinker. That is, in some instances, the probabilities can distinguish between lighting states associated with a front of a vehicle, a rear of the vehicle, or other aspects of the vehicle. A probability associated with the brake 226 can refer to a probability that the tracked object is associated with a brake lighting state. A probability associated with the reverse 228 can refer to a probability that the tracked object is associated with a reverse lighting state (or backup lighting state). A probability associated with the headlight(s) 230 can refer to a probability that the tracked object is associated with a headlight (e.g., main headlights, daytime running lights, fog lights, etc.) lighting state. A probability associated with the emergency 232 can refer to a probability that the tracked object is associated with an emergency lighting state (e.g., for an emergency vehicle such as a police vehicle, a fire truck, an ambulance, and the like). A probability associated with the hazard 234 can refer to a probability that the tracked object is associated with a hazard lighting state. As may be understood, in some instances, a tracked object may indicate a hazard by utilizing all blinkers (e.g., left front, right front, left rear, right rear, etc.) in a pattern (e.g., on/off). Thus, the machine learning component 120 can distinguish between blinker states and hazard states. Of course, other implementations of lighting states in tracked objects are contemplated herein.

The lighting state probabilities 204 can include additional probabilities associated with additional lighting states. For example, the lighting state probabilities 204 can include a probability associated with manual turn indications. Thus, the machine learning component 120 can be trained to identify manual turn signals (e.g., hand or arm-based signals). In some instances, an arm extended out a driver's window (in a left-hand drive country) can represent a left turn indication. In some instances, an arm extended out a driver's window with a bent elbow so that the hand is pointing down and the palm is facing backwards can represent a stop or brake indication. In some instances, an arm extended out a driver's window with a bent elbow so that the hand is pointing up and the palm is facing forwards can represent a right turn indication. Of course, other manual signals may be represented as well.

As discussed above, in some instances, the individual probabilities of the lighting state probability(s) 204 can be independent. That is, a probability associated with the left blinker 222 (for example) may be independent of the probability associated with the reverse 228. In any example, all probabilities may be output as an array of independent probabilities associated with the one or more lighting states.

In some instances, the lighting state probability(s) 204 can be used to determine the tracked object attribute(s) 206. By way of example, and without limitation, the tracked object attribute(s) 206 can include, but are not limited to a double-parked attribute 236, a cut-in attribute 238, a junction behavior attribute 240 (e.g., predicted trajectory(s)), a velocity attribute 242, and the like. Additional details of the tracked object attributes 206 are discussed in connection with FIGS. 4, 5, 6, and 7, as well as throughout this disclosure.

Figure 3:
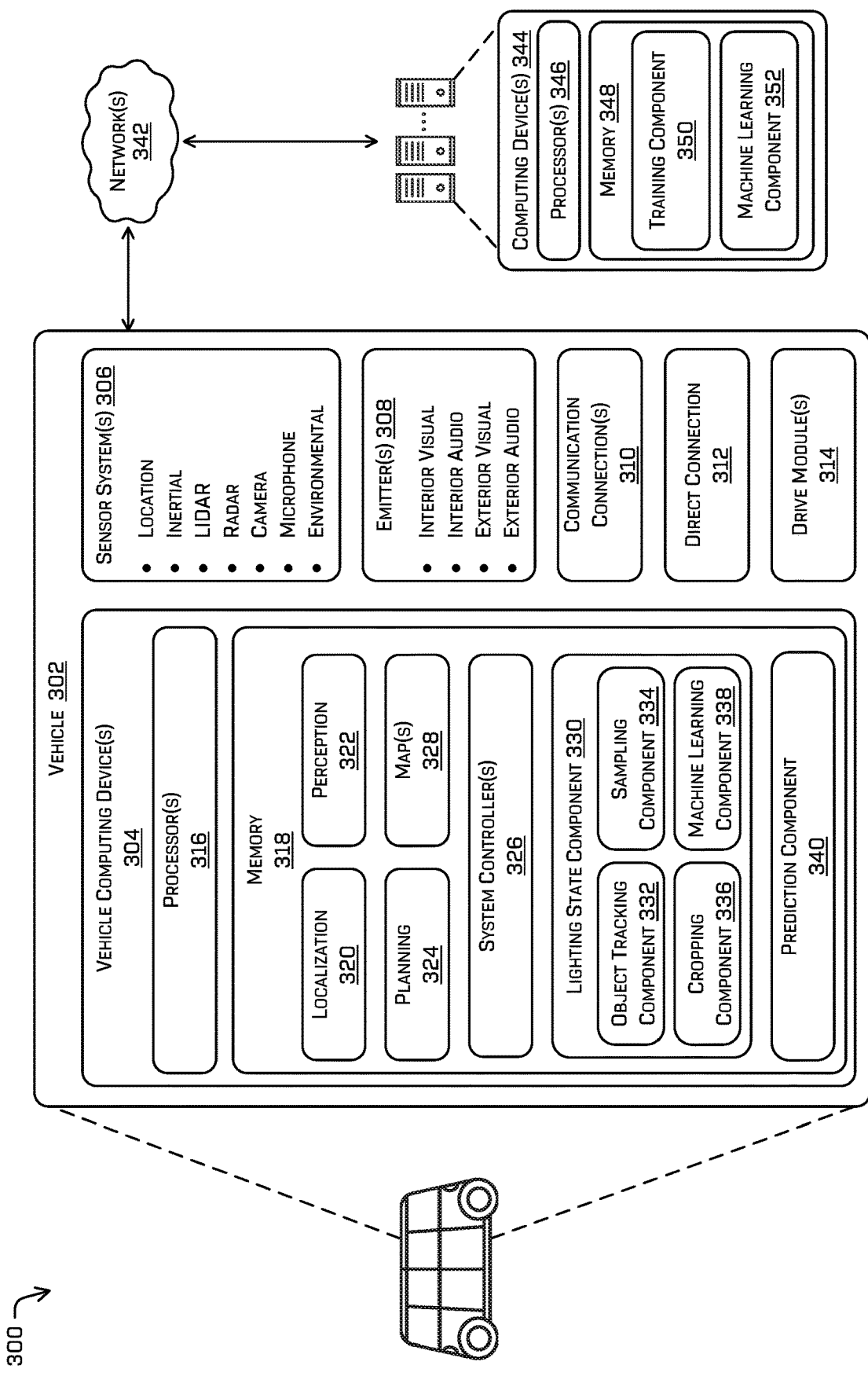
FIG. 3 depicts a block diagram of an example system for implementing the techniques described herein.

FIG. 3 depicts a block diagram of an example system 300 for implementing the techniques described herein. In at least one example, the system 300 can include a vehicle 302, which can correspond to the vehicle 102 in FIG. 1.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the one or more processors 316. In the illustrated example, the vehicle 302 is an autonomous vehicle; however, the vehicle 302 could be any other type of vehicle, or any other system having at least an image capture device (e.g., a camera enabled smartphone). In the illustrated example, the memory 318 of the vehicle computing device 304 stores a localization component 320, a perception component 322, a planning component 324, one or more system controllers 326, one or more maps 328, a lighting state component 330 having an object tracking component 332, a sampling component 334, a cropping component 336, and a machine learning component 338, and a prediction component 340. Though depicted in FIG. 3 as residing in the memory 318 for illustrative purposes, it is contemplated that the localization component 320, the perception component 322, the planning component 324, the one or more system controllers 326, the one or more maps 328, the lighting state component 330, the object tracking component 332, the sampling component 334, the cropping component 336, the machine learning component 338, and the prediction component 340 can additionally, or alternatively, be accessible to the vehicle 302 (e.g., stored on, or otherwise accessible by, memory remote from the vehicle 302). In some instances, the vehicle computing device(s) 304 can correspond to the vehicle computing device(s) 110 of FIG. 1.

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 320 can provide data to various components of the vehicle 302 to determine an initial position of an autonomous vehicle for generating a trajectory, as discussed herein.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In some instances, the planning component 324 can generate one or more trajectories for the vehicle 302 based at least in part on one or more probabilities associated with lighting states of tracked objects, attributes of the tracked objects, predicted trajectories of tracked objects, and the like.

In at least one example, the vehicle computing device 304 can include one or more system controllers 326, which can be configured to control steering, propulsion, braking, safety, emitters, communication, and other systems of the vehicle 302. These system controller(s) 326 can communicate with and/or control corresponding systems of the drive module(s) 314 and/or other components of the vehicle 302.

The memory 318 can further include one or more maps 328 that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 328 can include at least one map (e.g., images and/or a mesh). In some example, the vehicle 302 can be controlled based at least in part on the maps 328. That is, the maps 328 can be used in connection with the localization component 320, the perception component 322, and/or the planning component 324 to determine a location of the vehicle 302, identify objects in an environment, and/or generate routes and/or trajectories to navigate within an environment.

In some examples, the one or more maps 328 can be stored on a remote computing device(s) (such as the computing device(s) 344) accessible via network(s) 342. In some examples, multiple maps 328 can be stored based on, for example, a characteristic (e.g., type of entity, time of day, day of week, season of the year, etc.). Storing multiple maps 328 can have similar memory requirements, but increase the speed at which data in a map can be accessed.

In general, the lighting state component 330 can include functionality to receive image data captured by one or more image sensors and to determine one or more probabilities that image data representing a tracked object is associated with one or more lighting states. In some instances, the lighting state component 330 can correspond to the lighting state component 118 of FIG. 1.

The object tracking component 332 can include functionality to track one or more objects in an environment. In some instances, the object tracking component 332 can receive a two-dimensional bounding box associated with a tracked object represented in image data and/or a three-dimensional bounding box associated with a tracked object represented in, for example, LIDAR and/or RADAR data. In some instances, the object tracking component 332 can receive an identifier associated with a tracked object as well as a classification associated with the tracked object to determine that a tracked object in a first frame is a same as a tracked object in a second frame. In some instances, the object tracking component 332 can receive raw or processed sensor data to identify an object as a tracked object in the sensor data. In some instances, the object tracking component 332 can receive information about the velocity, acceleration, position, pose, etc. of the tracked object.

The sampling component 334 can include functionality to determine one or more frames of a plurality of frames to provide as input to the machine learning component 338. For example, the sampling component 334 can receive an indication of a tracked object in image data. In some instances, the sampling component 334 can receive a plurality of frames of image data captured at a particular frame rate associated with an image sensor. For example, an image sensor can capture image data at a rate of 30 frames per second (30 Hz), although any frame rate is contemplated herein. In some examples, the sampling component extracts five frames out of a plurality of frames of image data by extracting a frame, discarding the next three frames in series, extracting a next frame, and so on. In at least one example, a most recently acquired frame of the sequence is selected to be input into the machine learning component 338. Accordingly, the sampling component samples frames of image data out of a plurality of frames of image data to provide representative frames over time. In some cases, a period of time associated with the sampled frames can be on the order of 0.5 seconds, although any period of time can be used. In some instances, a sampling rate or frequency can be based at least in part on a frame rate of an image sensor and/or a duty cycle of lighting states associated with any detectable object.

The cropping component 336 can include functionality to receive image data and to crop at least a portion of the image data to isolate or represent a tracked object. For example, the cropping component 336 can receive a bounding box associated with the tracked object and can crop the image data based at least in part on the bounding box. In some instance, the cropping component 336 can include functionality to scale cropped image data based on an input image size of data to be input to the machine learning component 338. In some instances, the cropping component 336 can scale up a size of cropped image data, and in some instances, the cropping component 336 can scale down a size of cropped image data.

The machine learning component 338 can include functionality to receive a plurality of frames of image data and can output one or more probabilities that a tracked object represented in the image data represents one or more lighting states. As discussed above, in some instances, the one or more lighting states can include, but are not limited to: a left blinker state; a right blinker state; brake state; reverse (e.g., backup) state; a hazard state; headlight(s); running lights; emergency lights; fog lights; and the like. As further discussed herein, in some instances, the machine learning component 338 can comprise a convolutional neural network, a recurrent neural network, and the like. In some instances, a neural network can comprise one or more long-short term memory (LSTM) layers. In some instances, the machine learning component 338 can correspond to the machine learning component 120 of FIG. 1.

The prediction component 340 can include functionality to receive the one or more lighting state probabilities associated with a tracked object to determine one or more attributes associated with a tracked object and/or to determine one or more predicted trajectories associated with the tracked object. For example, the one or more attributes of a tracked object can include, but is not limited to, a change in velocity attribute, a double-parked attribute, a cut-in event attribute, a junction behavior attribute, and the like. In some instances, based at least in part on the lighting state probabilities and/or based on a velocity, acceleration, position, etc. of the tracked object, the prediction component 340 can determine a probability that the tracked object is associated with each attribute. In some instances, an attribute can correspond to a behavior, scenario, or class of behavior of a tracked object.

As can be understood, the components discussed herein (e.g., the localization component 320, the perception component 322, the planning component 324, the system controller(s) 326, the map(s) 328, the lighting state component 330, the object tracking component 332, the sampling component 334, the cropping component 336, the machine learning component 338, and the prediction component 340) are described as divided for illustrative purposes. However, the operations performed by the various components can be combined or performed in any other component. By way of example, cropping functions may be performed by the perception component 322 (e.g., rather than the cropping component 336) to reduce the amount of data transferred by the system.

In some instances, aspects of some or all of the components discussed herein can include any models, algorithms, and/or machine learning algorithms. For example, in some instances, the components in the memory 318 (and the memory 348, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 306 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally or alternatively, the sensor system(s) 306 can send sensor data, via the one or more networks 342, to the one or more computing device(s) at a particular frequency, after a lapse of a predetermined period of time, in near real-time, etc. In some instances, the sensor system(s) 306 can correspond to the sensor system(s) 108 of FIG. 1.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as network(s) 342. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 can provide a physical interface to couple the one or more drive module(s) 314 with the body of the vehicle 302. For example, the direction connection 312 can allow the transfer of energy, fluids, air, data, etc. between the drive module(s) 314 and the vehicle. In some instances, the direct connection 312 can further releasably secure the drive module(s) 314 to the body of the vehicle 302.

In at least one example, the localization component 320, perception component 322, the planning component 324, the lighting state component 330, the object tracking component 332, the sampling component 334, the cropping component 336, the machine learning component 338, and the prediction component 340 can process sensor data, as described above, and can send their respective outputs, over the one or more network(s) 342, to one or more computing device(s) 344. In at least one example, the localization component 320, perception component 322, the planning component 324, the lighting state component 330, the object tracking component 332, the sampling component 334, the cropping component 336, the machine learning component 338, and the prediction component 340 can send their respective outputs to the one or more computing device(s) 344 at a particular frequency, after a lapse of a predetermined period of time, in near real-time, etc.

In some examples, the vehicle 302 can send sensor data to one or more computing device(s) 344 via the network(s) 342. In some examples, the vehicle 302 can send raw sensor data to the computing device(s) 344. In other examples, the vehicle 302 can send processed sensor data and/or representations of sensor data to the computing device(s) 344. In some examples, the vehicle 302 can send sensor data to the computing device(s) 344 at a particular frequency, after a lapse of a predetermined period of time, in near real-time, etc. In some cases, the vehicle 302 can send sensor data (raw or processed) to the computing device(s) 344 as one or more log files.

The computing device(s) 344 can include processor(s) 346 and a memory 348 storing a training component 350 and a machine learning component 352.

In some instances, the training component 350 can include functionality to receive image data representing one or more object in an environment and to generate training data to training the machine learning component 352, as discussed herein. In some instances, the training component 350 can receive raw image data captured by sensors. In some instances, the training component 350 can determine a bounding box associated with one or more objects in the environment. In some instances, the training component 350 can receive a bounding box in association with the image data. In some instances, the training component 350 can present a user interface allowing for a user to annotate various frames of image data to indicate whether the image data represents a lighting state.

In some instances, the machine learning component 352 can include functionality to receive the training data generated by the training component 350 to train one or more machine learning algorithms, as discussed herein. In some instances, the machine learning algorithm generated by the machine learning component 352 can be sent to one or more vehicles (such as the vehicle 302) to be implemented by the vehicle computing device(s), as discussed herein.

The processor(s) 316 of the vehicle 302 and the processor(s) 346 of the computing device(s) 344 can be any suitable processor capable of executing instructions to process data and perform operations as described herein. By way of example and not limitation, the processor(s) 316 and 346 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 348 are examples of non-transitory computer-readable media. The memory 318 and 348 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the computing device(s) 344 and/or components of the computing device(s) 344 can be associated with the vehicle 302. That is, the vehicle 302 can perform one or more of the functions associated with the computing device(s) 344, and vice versa. Further, aspects of the lighting state component 330 and/or the prediction component 340 can be performed on any of the devices discussed herein.

FIGS. 4-8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
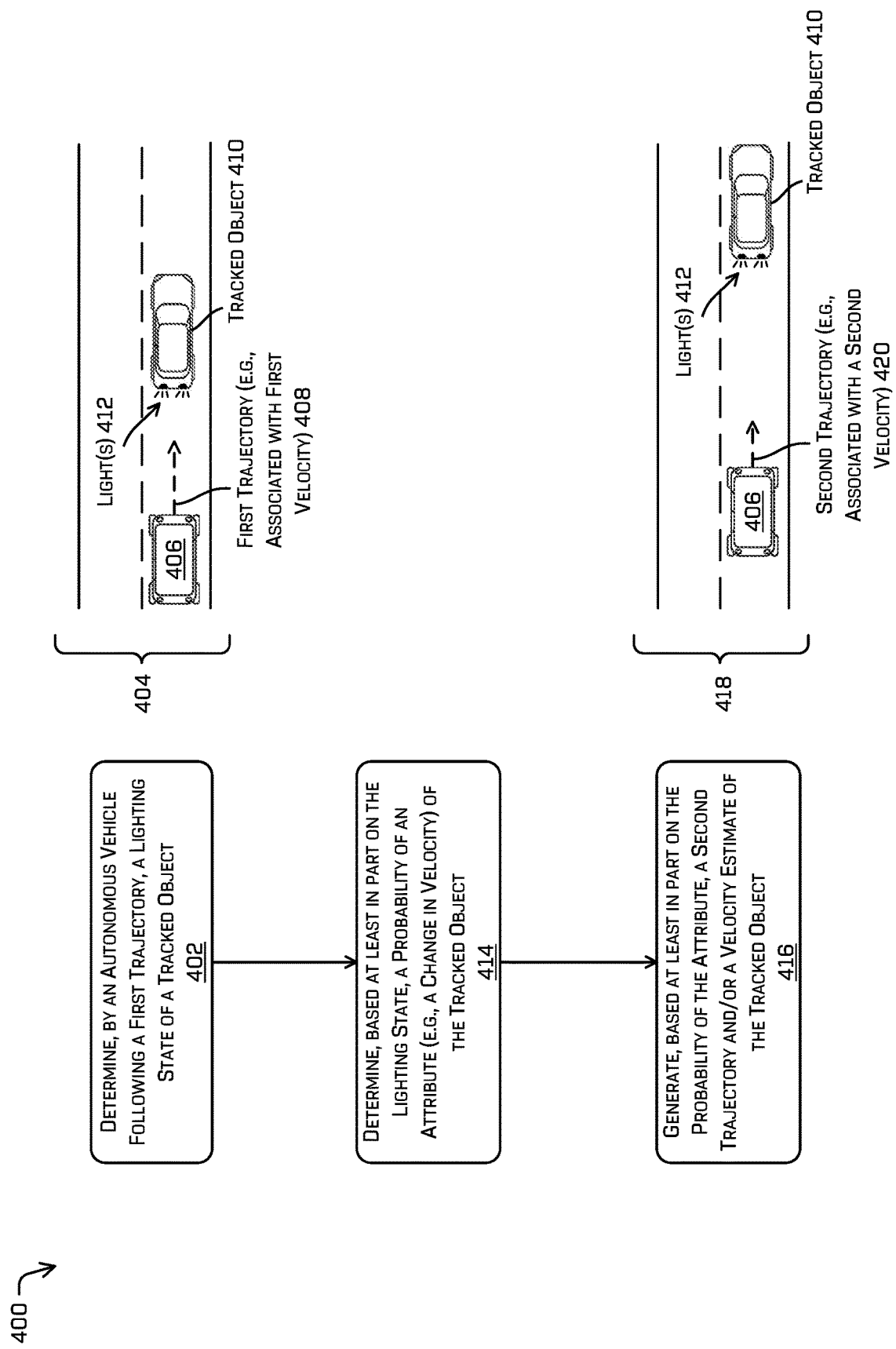
FIG. 4 is a pictorial flow diagram of an example process for determining a lighting state of a tracked object, determining an attribute of the tracked object (e.g., a change in velocity) and generating a trajectory for an autonomous vehicle and/or a velocity estimate for the tracked object, in accordance with embodiments of the disclosure.

FIG. 4 is a pictorial flow diagram of an example process for determining a lighting state of a tracked object, determining an attribute of the tracked object (e.g., a change in velocity) and generating a trajectory for an autonomous vehicle and/or a velocity estimate for the tracked object, in accordance with embodiments of the disclosure. For example, some or all of the process 400 can be performed by one or more components in FIG. 3, as described herein.

At operation 402, the process can include determining, by an autonomous vehicle following a first trajectory, a lighting state of a tracked object. In an example, 404, an autonomous vehicle 406 can traverse an environment in accordance with a first trajectory 408. In some instances, the first trajectory 408 can be associated with at least a first velocity of the autonomous vehicle 406. The example 404 also illustrates a tracked object 410 associated with various light(s) 412. As can be understood, the light(s) 412 can represent a braking state of the tracked object 410, which can be captured in image data by the autonomous vehicle 406 and determined to correspond to a braking lighting state in the operation 402. For example, and as discussed herein, the vehicle 406 can capture image data of the tracked object 410 and can provide at least a portion of the image data to a machine learning algorithm to receive a probability(s) of the various lighting states of the tracked object 410.

At operation 414, the process can include determining, based at least in part on the lighting state, a probability of an attribute (e.g., a change in velocity) of the tracked object. In some instances, as the lighting state represents a braking lighting state, the operation 414 can include that the lighting state indicates that the tracked object 410 may be changing (e.g., decreasing) a velocity. In some instances, as there may be any number of attributes associated with the tracked object 410, the operation 414 can include determining a probability associated with each of the various attributes.

At operation 416, the process can include generating, based at least in part on the probability of the attribute, a second trajectory and/or a velocity estimate of the tracked object. In an example 418, the autonomous vehicle 4016 is illustrated as navigating the environment based on a second trajectory 420, which may be associated with a second velocity that is lower than the first velocity (e.g., slowing down in response to the tracked object 410 slowing down). By way of illustration, the relative lengths of the arrows of the first trajectory 408 and the second trajectory 420 indicate relative velocities. In some instances, the operation 416 can include determining a velocity estimate for the tracked object indicating a change of velocity (e.g., decreasing velocity). In some instances, the operation 416 can include determining an update to a velocity estimate based on measured sensor data from the environment.

Figure 5:
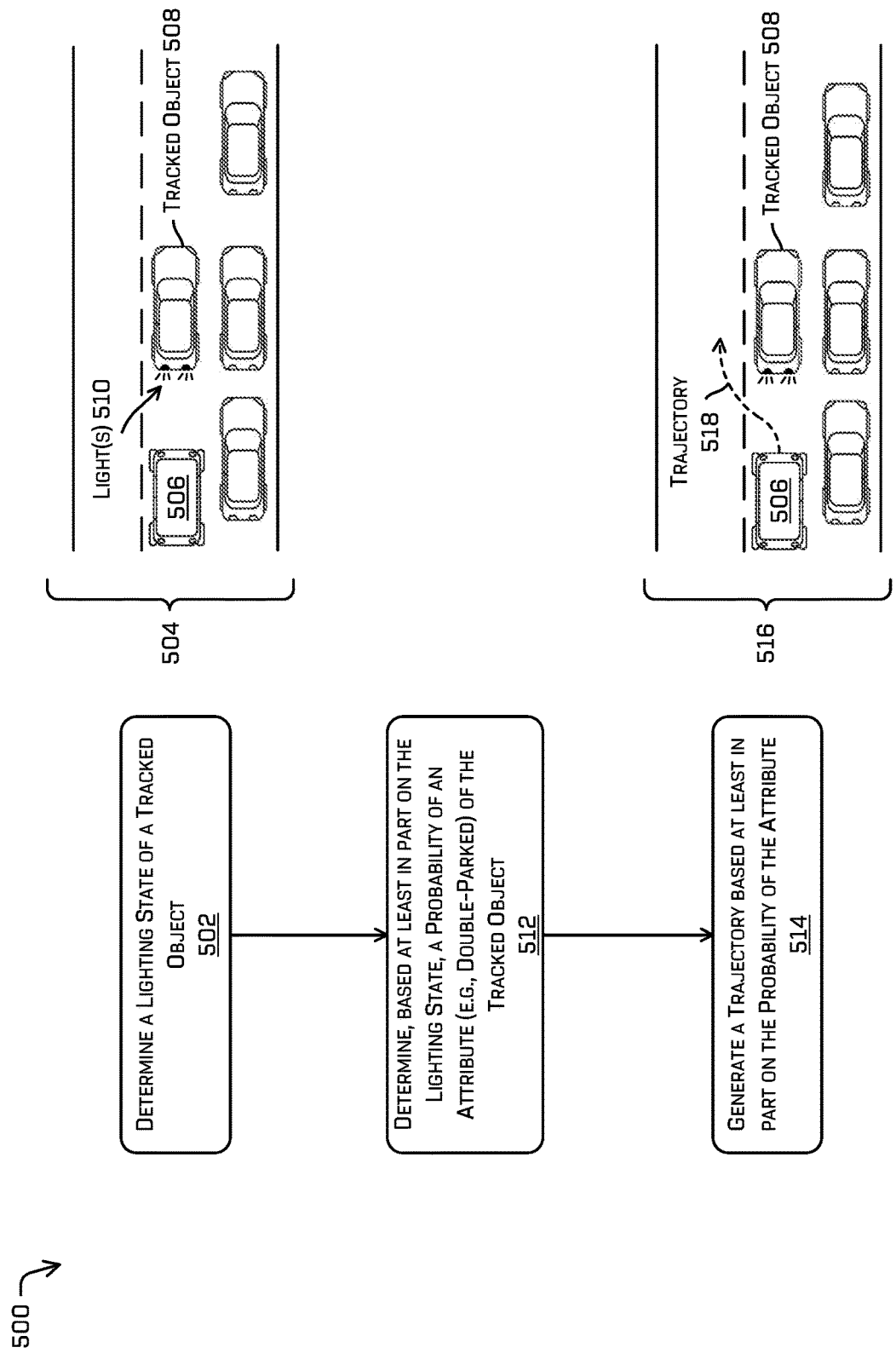
FIG. 5 is a pictorial flow diagram of an example process for determining a lighting state of a tracked object, determining an attribute of the tracked object (e.g., a double-parked attribute), and generating a trajectory for an autonomous vehicle, in accordance with embodiments of the disclosure.

FIG. 5 is a pictorial flow diagram of an example process 500 for determining a lighting state of a tracked object, determining an attribute of the tracked object (e.g., a double-parked attribute), and generating a trajectory for an autonomous vehicle, in accordance with embodiments of the disclosure. For example, some or all of the process 500 can be performed by one or more components in FIG. 3, as described herein.

At operation 502, the process can include determining a lighting state of a tracked object. In an example 504, an autonomous vehicle 506 can capture sensor data of a tracked object 508 associated with light(s) 510. For example, the vehicle 506 can capture image data of the tracked object 508 and can provide at least a portion of the image data to a machine learning algorithm to receive a probability(s) of the various lighting states of the tracked object 508. In some instances, the lighting state determined in the operation 502 may represent a hazard lighting state or a brake lighting state.

At operation 512, the process can include determining, based at least in part on the lighting state, a probability of an attribute (e.g., double-parked) of the tracked object. In some examples, the operation 512 can include determining that a velocity of the tracked object 508 is zero and/or that the tracked object 508 is proximate to a curb. In some instances, the operation can include determining that other vehicles (e.g., non-autonomous vehicles have driven around the tracked object 508. Additional details of determining a blocking vehicle (e.g., a double-parked vehicle) are discussed in U.S. application Ser. No. 15/897,028, which is herein incorporated by reference, in its entirety. As a non-limiting example, the lighting state may be used as a feature of the blocking vehicle input into a decision tree as described in the above referenced application, though any other use of the lighting state to determine a blocking vehicle is contemplated.

At operation 514, the process can include generating a trajectory based at least in part on the provability of the attribute. In an example 516, the autonomous vehicle 506 is illustrated as traversing the environment in accordance with a trajectory 518 to navigate around the tracked object 508. In this manner, the autonomous vehicle 506 can drive around the tracked object 508 upon determining that a probability that the tracked object is a double-parked vehicle meets or exceeds a threshold value.

Figure 6:
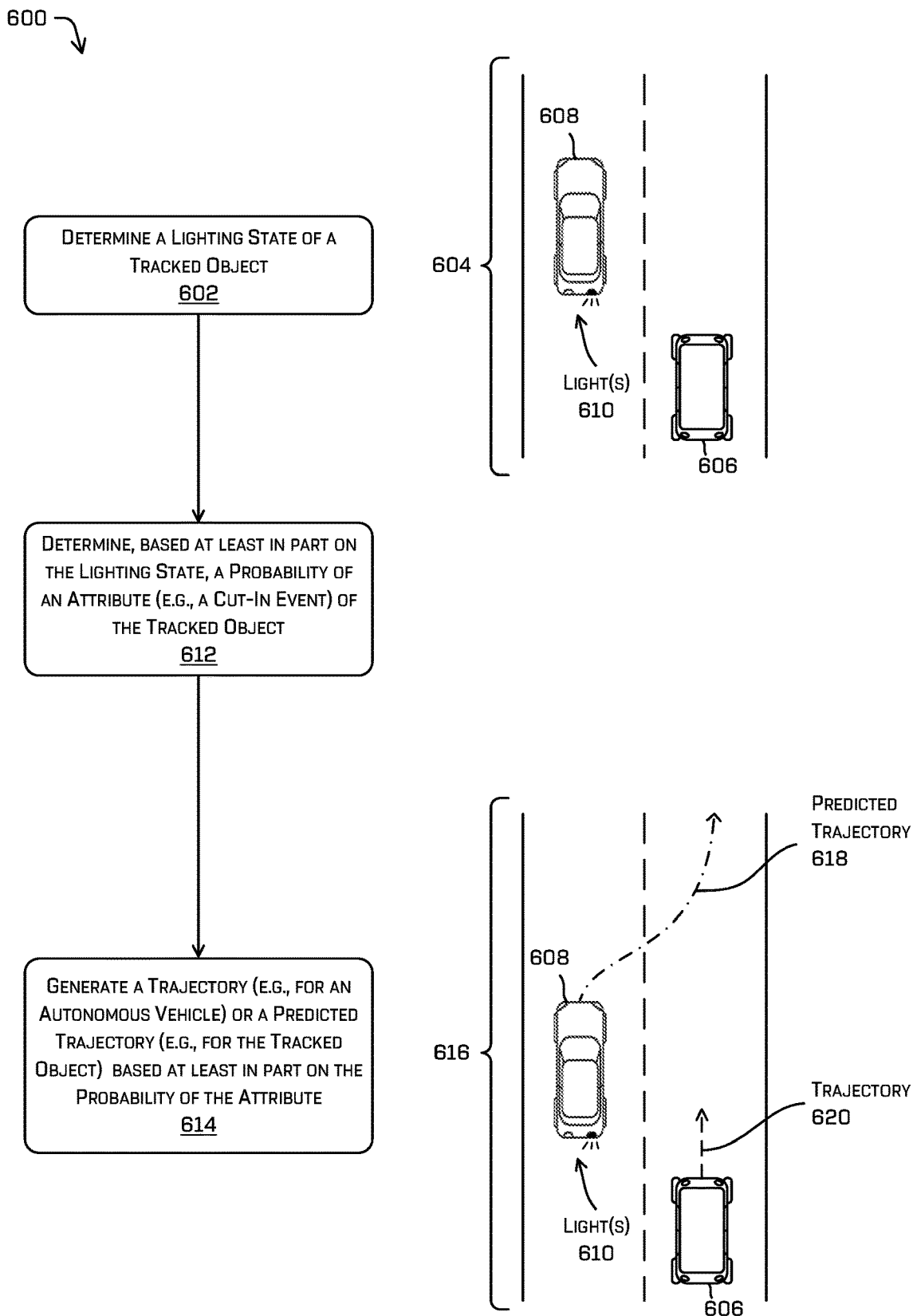
FIG. 6 is a pictorial flow diagram of an example process for determining a lighting state of a tracked object, determining an attribute of the tracked object (e.g., a cut-in event), and generating a trajectory for an autonomous vehicle and/or a predicted trajectory for the tracked object, in accordance with embodiments of the disclosure.

FIG. 6 is a pictorial flow diagram of an example process 600 for determining a lighting state of a tracked object, determining an attribute of the tracked object (e.g., a cut-in event), and generating a trajectory for an autonomous vehicle and/or a predicted trajectory for the tracked object, in accordance with embodiments of the disclosure. For example, some or all of the process 600 can be performed by one or more components in FIG. 3, as described herein.

At operation 602, the process can include determining a lighting state of a tracked object, as discussed herein. In an example 604, an autonomous vehicle 606 navigates through an environment that includes a tracked object 608 having light(s) 610. As can be understood, the light(s) 610 of the tracked object 608 can correspond to a right blinker lighting state, which may indicate that the tracked object may enter a region associated with the autonomous vehicle 606 (e.g., the lane occupied by the autonomous vehicle 606). As discussed herein, the vehicle 606 can capture image data of the tracked object 608 and can provide at least a portion of the image data to a machine learning algorithm to receive a probability(s) of the various lighting states of the tracked object 608.

At operation 612, the process can include determining, based at least in part on the lighting state, a probability of an attribute (e.g., a cut-in event) of the tracked object. Additional details of determining a cut-in event are discussed in U.S. application Ser. No. 15/947,486, which is herein incorporated by reference, in its entirety. As a non-limiting example, the lighting state may be used as a feature of the tracked object 608 input into a decision tree as described in the above referenced application, though any other use of the lighting state to determine a cut-in event of the tracked object 608 is contemplated. In some instances, the operation 612 can include determining a velocity of the tracked object 608, a pose of the tracked object 608, a velocity and/or trajectory of the tracked object 608, and the like.

At operation 614, the process can include generating a trajectory (e.g., for an autonomous vehicle) or a predicted trajectory (e.g., for the tracked object) based at least in part on the probability of the attribute. In an example 616, the tracked object 608 is illustrated in connection with a predicted trajectory 618, which may represent predicted motion of the tracked object 608 based on the lighting state and/or attribute, as discussed herein. For example, the predicted trajectory is shown as a path from a left lane of the road towards the right lane of the road in front of the vehicle 606. Similar, the vehicle 606 is illustrated in connection with a trajectory 620. In some cases, the trajectory 620 may be generated to preserve or ensure a minimum following distance between the tracked object 608 and the vehicle 606.

Figure 7:
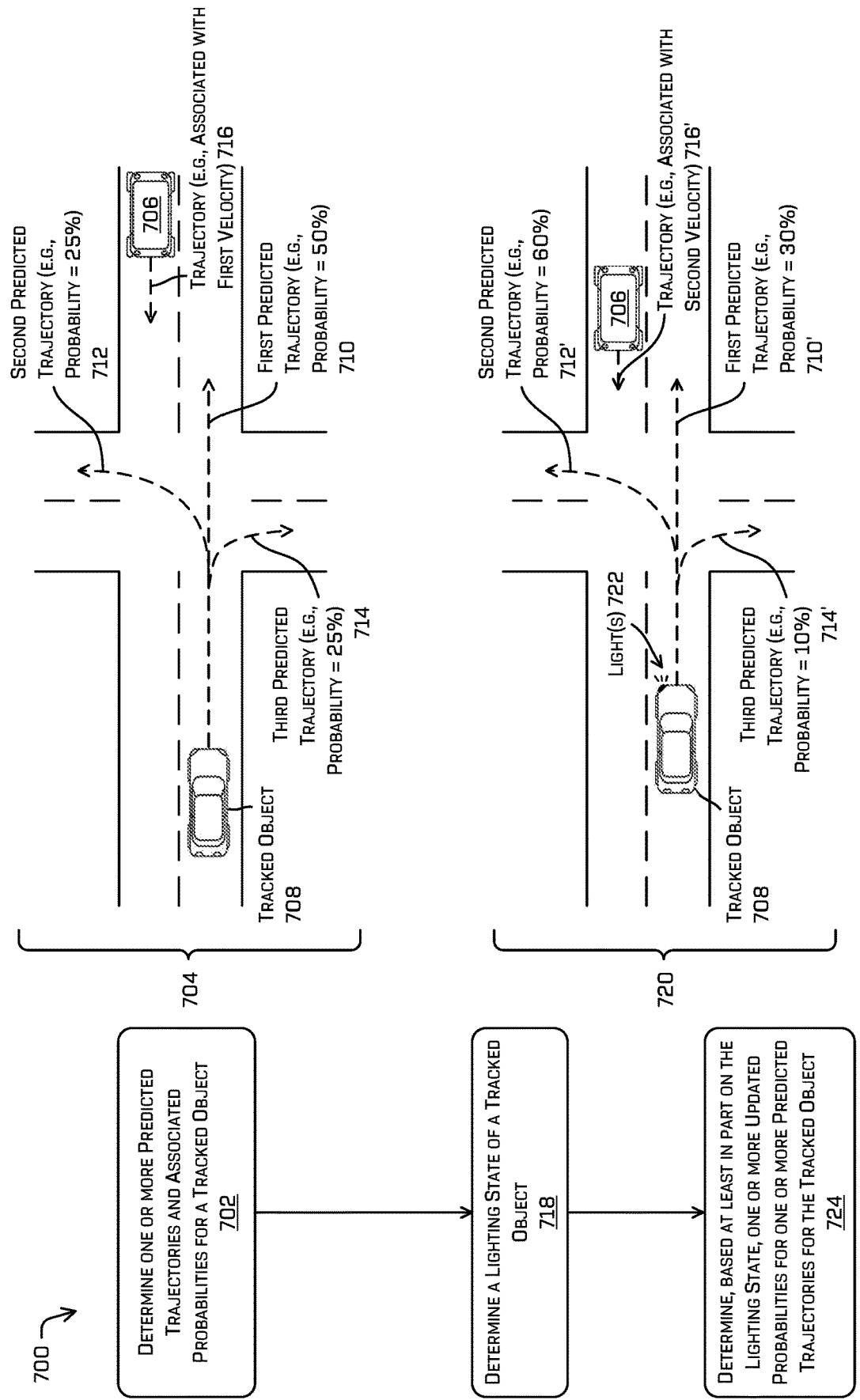
FIG. 7 is a pictorial flow diagram of an example process for determining probabilities associated with predicted trajectories for a tracked object, determining a lighting state of a tracked object, and determining updated probabilities associated with the predicted trajectories, in accordance with embodiments of the disclosure.

FIG. 7 is a pictorial flow diagram of an example process 700 for determining probabilities associated with predicted trajectories for a tracked object, determining a lighting state of a tracked object, and determining updated probabilities associated with the predicted trajectories, in accordance with embodiments of the disclosure. For example, some or all of the process 700 can be performed by one or more components in FIG. 3, as described herein.

At operation 702, the process can include determining one or more predicted trajectories and associated probabilities for a tracked object. An example 704 can include a vehicle 706 (e.g., an autonomous vehicle) traversing an environment including a tracked object 708. In some instances, the vehicle 706 can determine various predicted trajectories for the tracked object 708 based at least in part on roadways in the environment. For example, the tracked object 708 can be associated with a first predicted trajectory 710, which may represent the tracked object 708 continuing straight down the road. In some instances, the first predicted trajectory 710 can be associated with a probability of 50%. Further, the tracked object 708 can be associated with a second predicted trajectory 712, which can be associated with a probability of 25%. As illustrated, the second predicted trajectory 712 can represent the tracked object 708 turning left at the intersection. Further, the tracked object 708 can be associated with a third predicted trajectory 714, which can be associated with a probability of 25%. As illustrated, the third predicted trajectory 714 can represent the tracked object 708 turning right at the intersection. Of course, these predicted trajectories and probabilities associated with the predicted trajectories are merely examples, and various implementations are considered herein. Additional details of generating one or more predicted trajectories are discussed in U.S. application Ser. No. 15/833,715, which is herein incorporated by reference, in its entirety.

In some examples, the vehicle 706 can be associated with a trajectory 716, which may be associated with a first velocity, direction, orientation, pose, and the like.

At operation 718, the process can include determining a lighting state of a tracked object. As discussed herein, the vehicle 706 can capture image data of the tracked object and can provide at least a portion of the image data to a machine learning algorithm to receive a probability(s) of the various lighting states of the tracked object. In an example 720, the tracked object 708 is illustrated as having light(s) 722, which may correspond to a left front blinker lighting state.

At operation 724, the process can include determining, based at least in part on the lighting state, one or more updated probabilities for one or more predicted trajectories for the tracked object. As illustrated in the example 720, the tracked object 708 can be associated with trajectories 710', 712', and 714', which represent the first predicted trajectory 710, the second predicted trajectory 712, and the third predicted trajectory 714 with updated probabilities. As illustrated, the determining of the lighting state as a left blinker lighting state may increase a probability of the second predicted trajectory 712' (e.g., from 25% in the predicted trajectory 712 to 60% in the predicted trajectory 712'), although specific probabilities may vary from what is illustrated herein. Similarly, although a probability of the first predicted trajectory 710 is illustrated as changing from 50% to 30% as the first predicted trajectory 710', and the probability of the third predicted trajectory 714 is illustrated as changing from 25% to 10% as the third predicted trajectory 714', any probabilities are contemplated herein. Though depicted in FIG. 7 as a change in probabilities for illustrative purposes (e.g., to depict a difference between probabilities incorporating lighting states and those that do not), in at least some examples, such probabilities may originally be determined based on the lighting states such that no update step is necessary.

In some instances, the operation 724 can include determining an updated trajectory 716' for the vehicle 706. In some instances, the updated trajectory 716' may be associated with a second velocity, direction, orientation, pose, and the like. In some instances, the updated trajectory 716' can be based at least in part on the lighting states and/or the updated probabilities, as discussed herein. For example, as the second predicted trajectory 712' is represented as having an increase probability (e.g., based on the light(s) 722, a velocity of the trajectory 716' can be reduced (relative to the first velocity of the trajectory 716 in anticipation of the tracked object 708 turning in front of or proximate to the vehicle 706.

Figure 8:
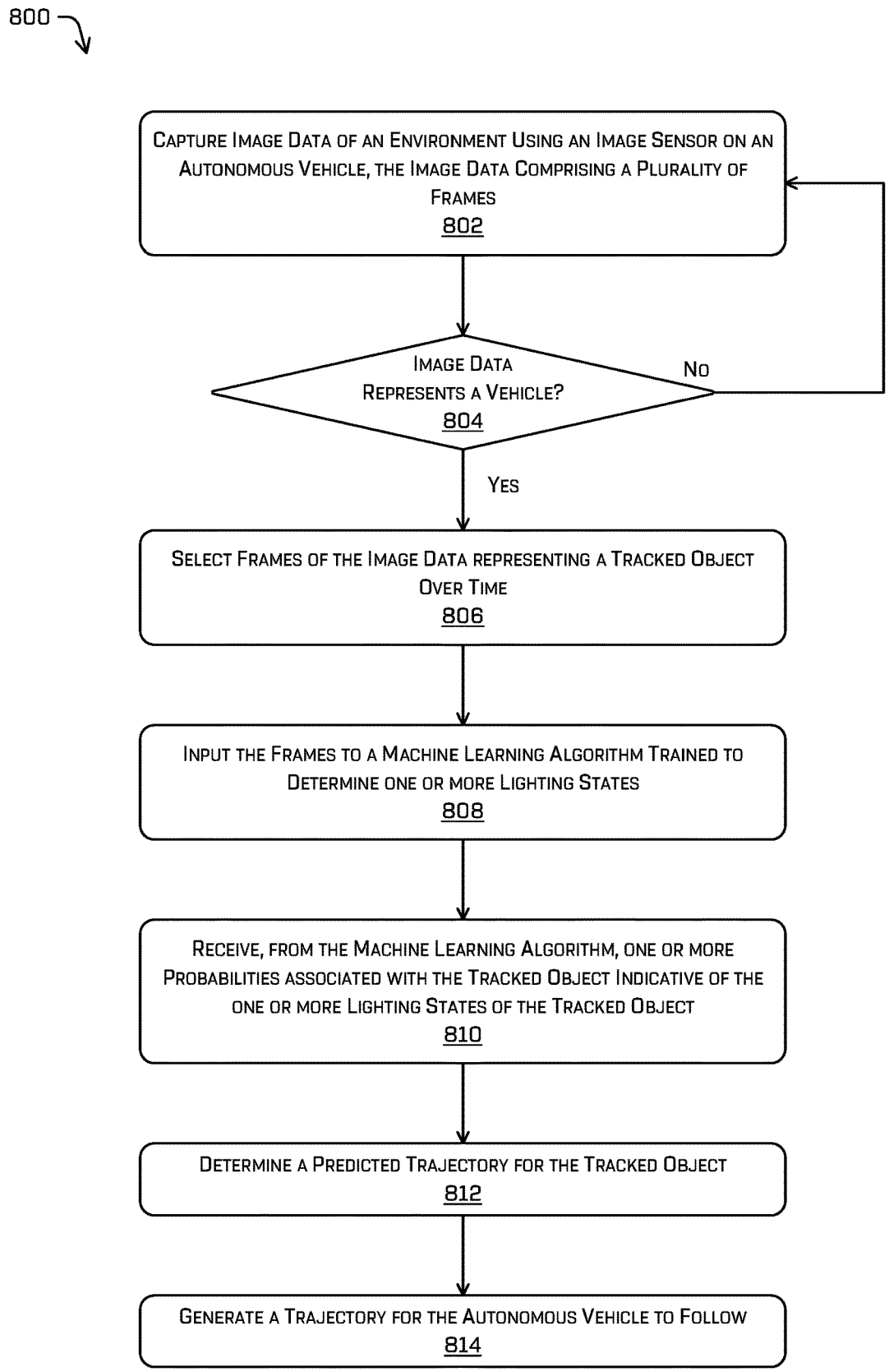
FIG. 8 depicts an example process for determining one or more probabilities associated with one or more lighting states of a tracked object and generating a trajectory for an autonomous vehicle and/or a predicted trajectory for the tracked object, in accordance with embodiments of the disclosure.

FIG. 8 depicts an example process 800 for determining one or more probabilities associated with one or more lighting states of a tracked object and generating a trajectory for an autonomous vehicle and/or a predicted trajectory for the tracked object, in accordance with embodiments of the disclosure. For example, some or all of the process 800 can be performed by one or more components in FIG. 3, as described herein. For example, some or all of the process 800 can be performed by the vehicle computing device(s) 304.

At operation 802, the process can include capturing image data of an environment using an image sensor on an autonomous vehicle, the image data comprising a plurality of frames. As discussed herein, the image data can represent video data captured at a particular frame rate, which in some cases may be on the order of 30 frames per second. In some instances, the operation 802 can include capturing a variety of sensor data, including but not limited to LIDAR data, radar data, sonar data, IMU data, location data, and the like.

At operation 804, the process can include determining whether the image data represents a vehicle. In some instances, if no such vehicle is represented, the process returns to the operation 802 where more image data is captured. If there is a vehicle represented by the image data (e.g., "yes" in the operation 804), the vehicle can be considered to be a tracked object, and the process continues. In some instances, the operation 804 can be performed, at least in part, by a detection and/or classification system trained to determine vehicles in image data. Generally, "tracking" comprise determining that an object detected in one image (or other form of sensor data, e.g. LIDAR return signals) is present in a previous and/or subsequent image.

At operation 806, the process can include selecting frames of the image data representing a tracked object over time. As discussed herein, the operation 806 can include selecting a plurality of frames of image data (e.g., a subset of the image data) to view changes in light patterns over time. In some instances, the number of frames and/or sampling frequency can be based at least in part on a frame rate of an image sensor. In at least some examples, the process 800 also determines at 806 if the tracked object is present in each of the plurality of frames (or at least a threshold number of the plurality of frames). In some examples, the plurality of frames comprises the most recently acquired image data.

At operation 808, the process can include inputting the frames to a machine learning algorithm that has been trained to determine one or more lighting states associated with the tracked object. By way of example and without limitation, the one or more lighting states can include, but is not limited to: a front left blinker state; a front right blinker state; a rear left blinker state; a rear right blinker state; a brake state; a reverse state; a hazard state; an emergency state; headlight(s); running lights; fog lights; and the like. In some instances, the machine learning algorithm can include a convolution neural network, a recurrent neural network, and the like. In some examples, the machine learning algorithm can comprise at least one long short-term memory (LSTM) layers.

At operation 810, the process can include receiving, from the machine learning algorithm, one or more probabilities associated with the tracked object indicative of the one or more lighting states of the tracked object. For example, in some instances, lighting state probabilities are independent.

At operation 812, the process can include determining a predicted trajectory for the tracked object. For example, the predicted trajectory can be based at least in part on the one or more lighting states and/or attributes of the tracked object (and/or probabilities associated with the one or more lighting states or the attributes). In some instances, the predicted trajectory can include velocity information, acceleration information, pose information, and/or expected behavior based on the lighting states and/or attributes, as discussed herein.

At operation 814, the process can include generating a trajectory for the autonomous vehicle to follow. For example, based at least in part on the one or more lighting states of the tracked object and/or based at least in part on the one or more attributes of the tracked object, the operation 814 can include generating a trajectory for the autonomous vehicle. In some instances, the operation 814 can include generating the trajectory based at least in part on the predicted trajectory (e.g., generated in the operation 812). In some instances, the operation 814 can include causing the autonomous vehicle to follow the generated trajectory.

EXAMPLE CLAUSES

A. A system comprising: one or more processors; and one or more computer-readable media storing instructions executable by the one or more processors, wherein the instructions, when executed, cause the system to perform operations comprising: capturing image data of an environment using an image sensor on an autonomous vehicle, the image data comprising a plurality of frames captured over time; identifying a vehicle in the plurality of the frames as a tracked object in the environment; extracting, from a first frame of the image data, first cropped image data representing the tracked object at a first time; extracting, from a second frame of the image data, second cropped image data representing the tracked object at a second time; inputting a subset of the image data comprising at least the first cropped image data and the second cropped image data to a machine learning algorithm; receiving, from the machine learning algorithm, a probability that the first cropped image data representing the tracked object is associated with a lighting state of the tracked object, wherein the lighting state comprises one or more of a left blinker state, a right blinker state, a braking state, or a hazard state; generating, based at least in part on the probability, a trajectory for the autonomous vehicle; and causing the autonomous vehicle to follow the trajectory.

B: The system of paragraph A, wherein the machine learning algorithm is trained using training image data annotated to indicate a ground truth state of the lighting state of the tracked object.

C: The system of paragraph A, wherein the probability is a first probability, the operations further comprising: determining, based at least in part on the first probability, one or more of: a second probability that the tracked object is a double-parked vehicle; a third probability associated with the tracked object entering a region associated with the autonomous vehicle; a fourth probability associated with a predicted trajectory of the tracked object; or a change in a velocity associated with the tracked object.

D: The system of paragraph A, the operations further comprising: selecting the first frame of the image data and the second frame of the image data based at least in part on a sampling frequency.

E: The system of paragraph A, wherein the lighting state comprises the left blinker state, the right blinker state, the braking state, and the hazard state, the operations further comprising: outputting individual probabilities for the lighting state.

F: A method comprising: capturing image data of an environment using an image sensor, the image data comprising a plurality of frames captured over time; identifying a vehicle as a tracked object in the image data; selecting a first frame of the image data representing the tracked object at a first time; selecting a second frame of the image data representing the tracked object at a second time; inputting at least the first frame and the second frame to a machine learning algorithm; and receiving, from the machine learning algorithm, a probability associated with the tracked object indicative of a lighting state of the tracked object.

G: The method of paragraph F, wherein the image sensor is disposed on an autonomous vehicle, the method further comprising: generating, based at least in part on the probability, a trajectory for the autonomous vehicle; and causing the autonomous vehicle to follow the trajectory.

H: The method of paragraph F, wherein the lighting state comprises one or more of: a front left blinker state; a front right blinker state; a rear left blinker state; a rear right blinker state; a braking state; a backup state; an emergency state; or a hazard state.

I: The method of paragraph F, wherein the probability comprises one or more of: a first probability associated with a left blinker state of the tracked object; a second probability associated with a right blinker state of the tracked object; a third probability associated with a braking state of the tracked object; or a fourth probability associated with a hazard state of the tracked object.

J: The method of paragraph F, wherein the probability is a first probability, the method further comprising: receiving, from the machine learning algorithm, a second probability associated with the tracked object indicative of a manual signaling state of the tracked object.

K: The method of paragraph F, wherein the machine learning algorithm comprises at least one of a convolutional neural network or a recurrent neural network.

L: The method of paragraph F, further comprising: selecting, based at least in part on a sampling frequency, a subset of frames of the plurality of frames as input image data to the machine learning algorithm, wherein a number of frames of the subset of frames and the sampling frequency is based at least in part on a frame rate of the image sensor.

M: The method of paragraph F, further comprising: extracting, as extracted image data, a portion of the first frame representing the tracked object; comparing a size of the extracted image data to an input data size associated with the machine learning algorithm; and scaling the extracted image data based at least in part on the input data size.

N: The method of paragraph F, further comprising: selecting, based at least in part on the probability, one of a plurality of predicted trajectories for the tracked object.

O: The method of paragraph F, wherein the image sensor is disposed on an autonomous vehicle, the method further comprising: determining, based at least in part on the probability, one or more of: a first probability that the tracked object is a double-parked vehicle; a second probability associated with the tracked object entering a region associated with the autonomous vehicle; a third probability associated with a predicted trajectory of the tracked object; or a change in a velocity associated with the tracked object.

P: A non-transitory computer-readable medium storing instructions that, when executed, cause one or more processors to perform operations comprising: receiving image data of an environment captured by an image sensor on an autonomous vehicle, the image data comprising a plurality of frames captured over time; identifying a vehicle as a tracked object in the image data; selecting a first frame of the image data representing the tracked object at a first time; selecting a second frame of the image data representing the tracked object at a second time; inputting at least the first frame and the second frame to a machine learning algorithm; and receiving, from the machine learning algorithm, a probability associated with the tracked object indicative of a lighting state of the tracked object.

Q: The non-transitory computer-readable medium of paragraph P, wherein the lighting state comprises one or more of: a left blinker state; a right blinker state; a braking state; a backup state; an emergency state; or a hazard state.

R: The non-transitory computer-readable medium of paragraph P, wherein the probability comprises one or more of: a first probability associated with a left blinker state of the tracked object; a second probability associated with a right blinker state of the tracked object; a third probability associated with a braking state of the tracked object; or a fourth probability associated with a hazard state of the tracked object.

S: The non-transitory computer-readable medium of paragraph P, the operations further comprising: selecting, based at least in part on a sampling frequency, a subset of frames of the plurality of frames as input image data to the machine learning algorithm, wherein a number of frames of the subset of frames and the sampling frequency is based at least in part on a frame rate of the image sensor, and wherein the subset of frames comprises a most recently acquired frame.

T: The non-transitory computer-readable medium of paragraph P, the operations further comprising: determining, based at least in part on the probability, one or more of: a first probability that the tracked object is a double-parked vehicle; a second probability associated with the tracked object entering region associated with the autonomous vehicle; a third probability associated with a predicted trajectory of the tracked object; or a change in a velocity associated with the tracked object.

While the example clauses described above are described with respect to one particular implementation, it should be understood that, in the context of this document, the content of the example clauses can also be implemented via a method, device, system, and/or a computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more computer-readable media storing instructions executable by the one or more processors, wherein the instructions, when executed, cause the system to perform operations comprising:
      capturing image data of an environment using an image sensor on an autonomous vehicle, the image data comprising a plurality of frames captured over time;
      identifying a vehicle in the plurality of the frames as a tracked object in the environment;
      extracting, from a first frame of the image data, first cropped image data representing the tracked object at a first time;
      extracting, from a second frame of the image data, second cropped image data representing the tracked object at a second time;
      inputting, substantially simultaneously, a subset of the image data into an input layer of a machine learning algorithm to cause the machine learning algorithm to perform substantially simultaneous analysis on at least the first cropped image data and the second cropped image data, the inputting, substantially simultaneously, the subset of the image data into the input layer of the machine learning algorithm comprising:
         inputting, substantially simultaneously, at least the first cropped image data into a first input of the input layer of the machine learning algorithm and inputting the second cropped image data into a second input of the input layer of the machine learning algorithm;
      receiving, from the machine learning algorithm, a probability that the first cropped image data representing the tracked object is associated with a lighting state of the tracked object, wherein the lighting state comprises a left blinker state, a right blinker state, a braking state, and a hazard state and the probability comprises:
         a first probability associated with the left blinker state of the tracked object;
         a second probability associated with the right blinker state of the tracked object;
         a third probability associated with the braking state of the tracked object; and
         a fourth probability associated with the hazard state of the tracked object;
      generating, based at least in part on the probability, a trajectory for the autonomous vehicle; and
      causing the autonomous vehicle to follow the trajectory.

2. The system of claim 1, wherein the machine learning algorithm is trained using training image data annotated to indicate a ground truth state of the lighting state of the tracked object.

3. The system of claim 1, the operations further comprising:
   determining, based at least in part on the first probability, one or more of:
      a fifth probability that the tracked object is a double-parked vehicle;
      a sixth probability associated with the tracked object entering a region associated with the autonomous vehicle;
      a seventh probability associated with a predicted trajectory of the tracked object; or
      a change in a velocity associated with the tracked object.

4. The system of claim 1, the operations further comprising:
   selecting the first frame of the image data and the second frame of the image data based at least in part on a sampling frequency.

5. A method comprising:
   capturing image data of an environment using an image sensor, the image data comprising a plurality of frames captured over time;
   identifying a vehicle as a tracked object in the image data;
   selecting a first frame of the image data representing the tracked object at a first time;
   selecting a second frame of the image data representing the tracked object at a second time;
   inputting, substantially simultaneously, at least the first frame into a first input of an input layer of a machine learning algorithm and the second frame into a second input of the input layer of the machine learning algorithm to cause the machine learning algorithm to perform substantially simultaneous analysis on at least the first frame and the second frame; and
   receiving, from the machine learning algorithm, a probability associated with the tracked object indicative of a lighting state of the tracked object.

6. The method of claim 5, wherein the image sensor is disposed on an autonomous vehicle, the method further comprising:
   generating, based at least in part on the probability, a trajectory for the autonomous vehicle; and
   causing the autonomous vehicle to follow the trajectory.

7. The method of claim 5, wherein the lighting state comprises one or more of:
   a front left blinker state;
   a front right blinker state;
   a rear left blinker state;
   a rear right blinker state;
   a braking state;
   a backup state;
   an emergency state; or
   a hazard state.

8. The method of claim 5, wherein the probability comprises one or more of:
   a first probability associated with a left blinker state of the tracked object;
   a second probability associated with a right blinker state of the tracked object;
   a third probability associated with a braking state of the tracked object; or
   a fourth probability associated with a hazard state of the tracked object.

9. The method of claim 5 further comprising:
   receiving, from the machine learning algorithm, a second probability associated with the tracked object indicative of a manual signaling state of the tracked object.

10. The method of claim 5, wherein the machine learning algorithm comprises at least one of a convolutional neural network or a recurrent neural network.

11. The method of claim 5, further comprising:
selecting, based at least in part on a sampling frequency, a subset of frames of the plurality of frames as input image data to the machine learning algorithm,
wherein a number of frames of the subset of frames and the sampling frequency is based at least in part on a frame rate of the image sensor.

12. The method of claim 5, further comprising:
extracting, as extracted image data, a portion of the first frame representing the tracked object;
comparing a size of the extracted image data to an input data size associated with the machine learning algorithm; and
scaling the extracted image data based at least in part on the input data size.

13. The method of claim 5, further comprising:
selecting, based at least in part on the probability, one of a plurality of predicted trajectories for the tracked object.

14. The method of claim 5, wherein the image sensor is disposed on an autonomous vehicle, the method further comprising:
determining, based at least in part on the probability, one or more of:
a first probability that the tracked object is a double-parked vehicle;
a second probability associated with the tracked object entering a region associated with the autonomous vehicle;
a third probability associated with a predicted trajectory of the tracked object; or
a change in a velocity associated with the tracked object.

15. A non-transitory computer-readable medium storing instructions that, when executed, cause one or more processors to perform operations comprising:
receiving image data of an environment captured by an image sensor on an autonomous vehicle, the image data comprising a plurality of frames captured over time;
identifying a vehicle as a tracked object in the image data;
selecting a first frame of the image data representing the tracked object at a first time;
selecting a second frame of the image data representing the tracked object at a second time;
inputting, substantially simultaneously, at least the first frame into a first input of an input layer of a machine learning algorithm and the second frame into a second input of the input layer of the machine learning algorithm; and
receiving, from the machine learning algorithm, a probability associated with the tracked object indicative of a lighting state of the tracked object, wherein the lighting state comprises a left blinker state, a right blinker state, a braking state, and a hazard.

16. The non-transitory computer-readable medium of claim 15, wherein the lighting state further comprises one or more of:
a backup state; or
an emergency state.

17. The non-transitory computer-readable medium of claim 15, wherein the probability comprises one or more of:
a first probability associated with a left blinker state of the tracked object;
a second probability associated with a right blinker state of the tracked object;
a third probability associated with a braking state of the tracked object; or
a fourth probability associated with a hazard state of the tracked object.

18. The non-transitory computer-readable medium of claim 15, the operations further comprising:
selecting, based at least in part on a sampling frequency, a subset of frames of the plurality of frames as input image data to the machine learning algorithm,
wherein a number of frames of the subset of frames and the sampling frequency is based at least in part on a frame rate of the image sensor, and
wherein the subset of frames comprises a most recently acquired frame.

19. The non-transitory computer-readable medium of claim 15, the operations further comprising:
determining, based at least in part on the probability, one or more of:
a first probability that the tracked object is a double-parked vehicle;
a second probability associated with the tracked object entering a region associated with the autonomous vehicle;
a third probability associated with a predicted trajectory of the tracked object; or
a change in a velocity associated with the tracked object.

20. The non-transitory computer-readable medium of claim 15, further comprising:
extracting, as extracted image data, a portion of the first frame representing the tracked object;
comparing a size of the extracted image data to an input data size associated with the machine learning algorithm; and
scaling the extracted image data based at least in part on the input data size.

* * * * *